United States Patent
Dean

(10) Patent No.: US 10,099,299 B2
(45) Date of Patent: Oct. 16, 2018

(54) SYSTEM, METHOD AND APPARATUS FOR GROOVING PIPE BELLS

(71) Applicant: NORTH AMERICAN SPECIALTY PRODUCTS LLC, Houston, TX (US)

(72) Inventor: Roy Dean, Schwenksville, PA (US)

(73) Assignee: North American Pipe Corporation, Houston, TX (US)

( * ) Notice: Subject to any disclaimer, the term of this patent is extended or adjusted under 35 U.S.C. 154(b) by 0 days.

(21) Appl. No.: 15/401,672

(22) Filed: Jan. 9, 2017

(65) Prior Publication Data

US 2017/0209944 A1 Jul. 27, 2017

Related U.S. Application Data

(60) Provisional application No. 62/286,958, filed on Jan. 25, 2016.

(51) Int. Cl.
*B23C 3/34* (2006.01)
*F16L 21/00* (2006.01)

(52) U.S. Cl.
CPC ............ *B23C 3/34* (2013.01); *B23C 2220/36* (2013.01); *B23C 2270/18* (2013.01); *F16L 21/00* (2013.01)

(58) Field of Classification Search
CPC ... B23C 3/34; B23C 2220/36; B23C 2270/18; B23C 3/02; B23C 1/20; B23Q 9/0021; B23Q 9/0035; B23Q 9/0057
USPC .................................................. 409/143, 179
See application file for complete search history.

(56) References Cited

U.S. PATENT DOCUMENTS

| | | | | | |
|---|---|---|---|---|---|
| 1,114,376 | A | * | 10/1914 | Milkop | .................. B24B 23/08 451/135 |
| 4,175,471 | A | * | 11/1979 | Wilger | ..................... B23B 3/26 173/145 |
| 4,715,751 | A | * | 12/1987 | Rigoulot | ................. B23C 3/124 409/139 |
| 5,056,269 | A | * | 10/1991 | Westman | .................. E03F 3/06 15/104.05 |
| 6,086,297 | A | | 7/2000 | Lotfi | |
| 7,223,054 | B1 | | 5/2007 | Cady | |
| 8,607,676 | B2 | | 12/2013 | Ivan | |
| 8,881,355 | B2 | * | 11/2014 | Onishi | ............. B23B 29/03489 29/28 |
| 2003/0102139 | A1 | * | 6/2003 | Debat | ...................... B23C 3/02 173/1 |

FOREIGN PATENT DOCUMENTS

| | | |
|---|---|---|
| CN | 203357483 U | 12/2013 |
| JP | 2012-187671 A | 10/2012 |

* cited by examiner

*Primary Examiner* — Alan Snyder

(57) ABSTRACT

A pipe has an axis, a cylindrical portion, a cylindrical belled end and a conical transition portion between the cylindrical portion and the cylindrical belled end. A machine includes a body having an axis, a head configured to be complimentary in shape to the conical transition portion, a cutting portion configured to be complementary in shape to the cylindrical belled end, and the cutting portion is configured to rotate relative to the body and the pipe during formation of the groove to cut the groove inside the pipe.

20 Claims, 6 Drawing Sheets

SYSTEM, METHOD AND APPARATUS FOR GROOVING PIPE BELLS

This application claims priority to and the benefit of U.S. Prov. App. No. 62/286,958, filed on Jan. 25, 2016, and is incorporated herein by reference in its entirety.

BACKGROUND OF THE INVENTION

Field of the Disclosure

The present invention relates in general to belled pipes and, in particular, to a system, method and apparatus for forming grooves in the bells of pipes.

Description of the Prior Art

Conventional pipe bell grooving is performed with a machine that essentially uses a custom router head that follows the inside surface of the bell of the pipe. While the entire pipe is rotated, one or more grooves are cut into the internal surface of the bell. However, because the axis of the router is strictly fixed in relation to the axis of the pipe barrel (the barrel being the portion of the pipe that is not belled), any misalignment of the bell centerline axis with the barrel centerline axis can cause "walking" grooves (i.e., grooves that are not properly formed) within the bell. This can result in product that does not function properly and must be scrapped.

Angular misalignment is likely to cause the most problems in this regard. Even with a miniscule 0.25 degree angular misalignment between the pipe and the machine, the groove position within the bell will "walk" a total of more than 0.075 inches. The clearance between the groove and the spline that goes in the groove (at the time of pipe installation) is generally 0.125 inches, almost all of which is required for a standard tolerance stack. Thus, any deviations over about 0.015 inches of groove "walk" will result in scrapped parts. Accordingly, improvements in pipe bell grooving continue to be of interest.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
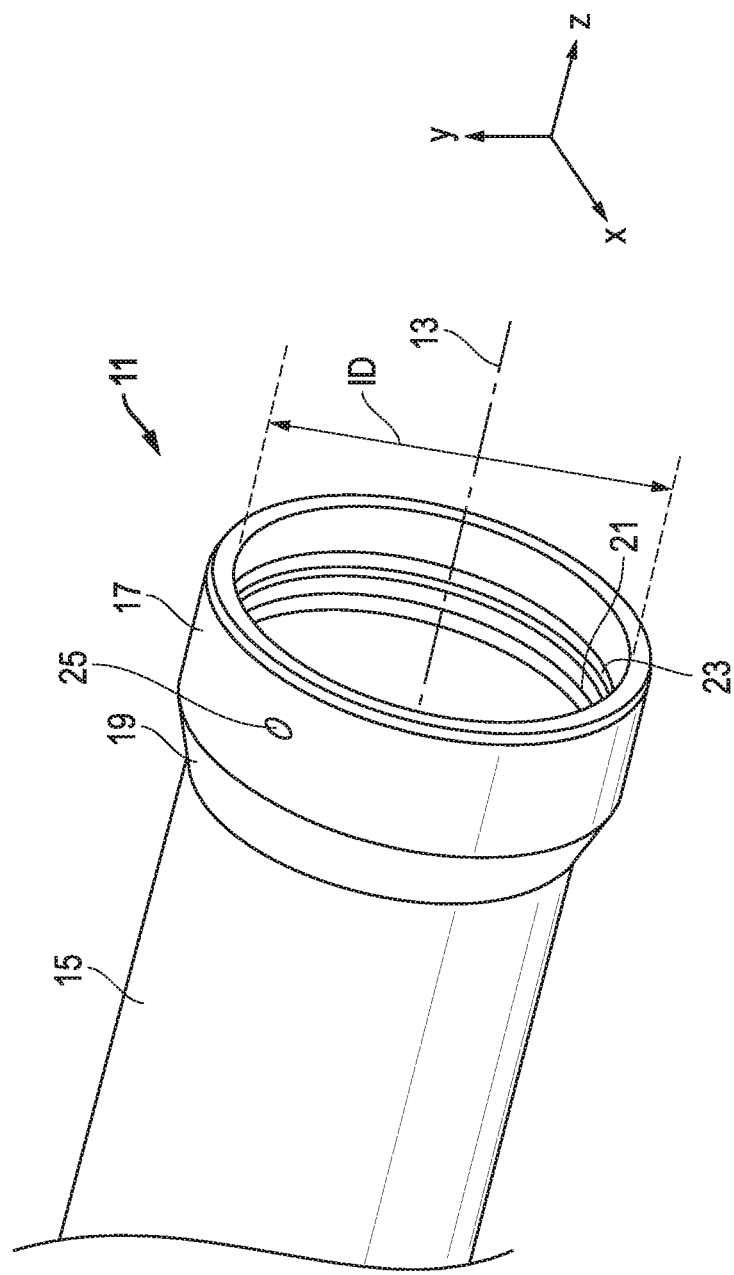
FIG. 1 is an isometric view of a pipe.

Embodiments of a system, method and apparatus for forming a groove inside a pipe are disclosed. For example, FIG. 1 illustrates a pipe 11 having an axis 13, a cylindrical portion 15, a cylindrical belled end 17 and a conical transition portion 19 between the cylindrical portion 15 and the cylindrical belled end 17. The interior of the pipe 11 may include one or more grooves 21, 23 (e.g., two shown). In one version, groove 21 may comprise a seal groove and groove 23 may comprise a spline groove. A spline hole 25 may extend from an exterior of the pipe 11 to the groove 23.

Figure 2:
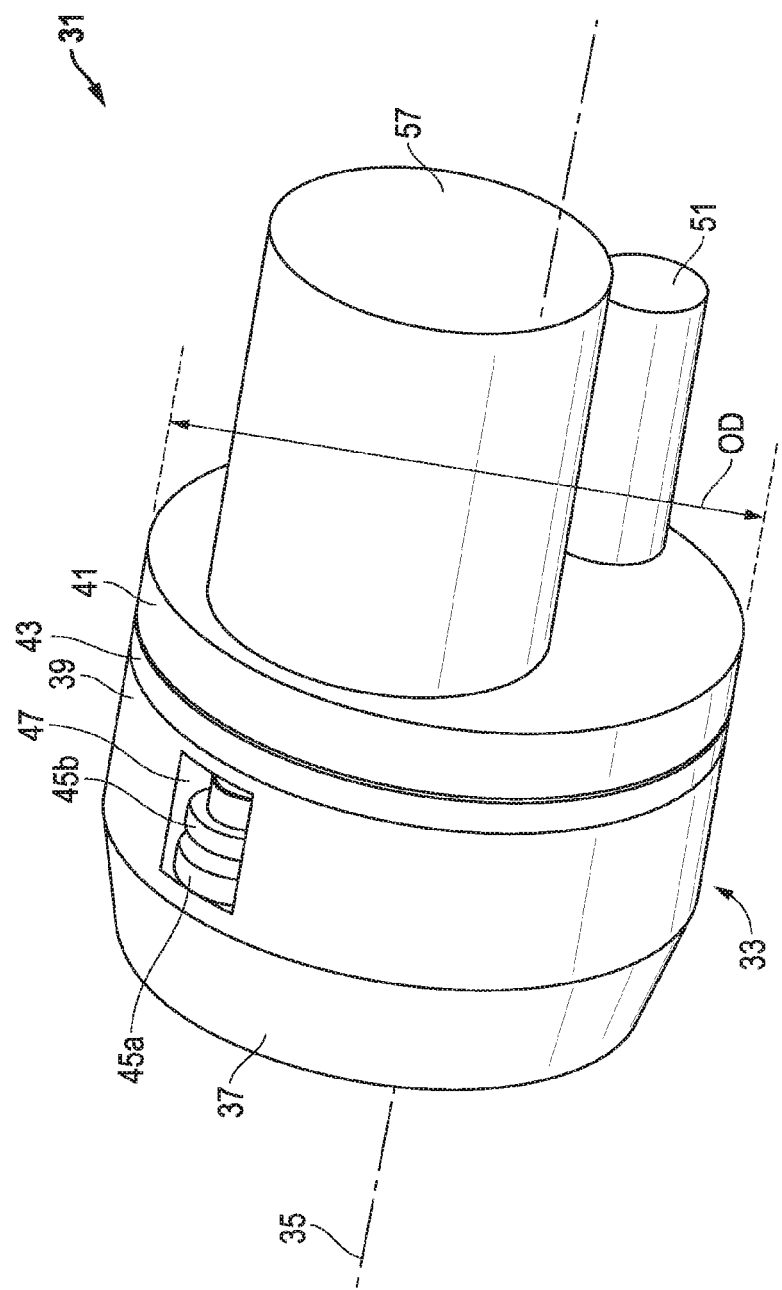
FIG. 2 is an isometric view of an embodiment of a machine for forming a groove in a pipe.
Figure 3:
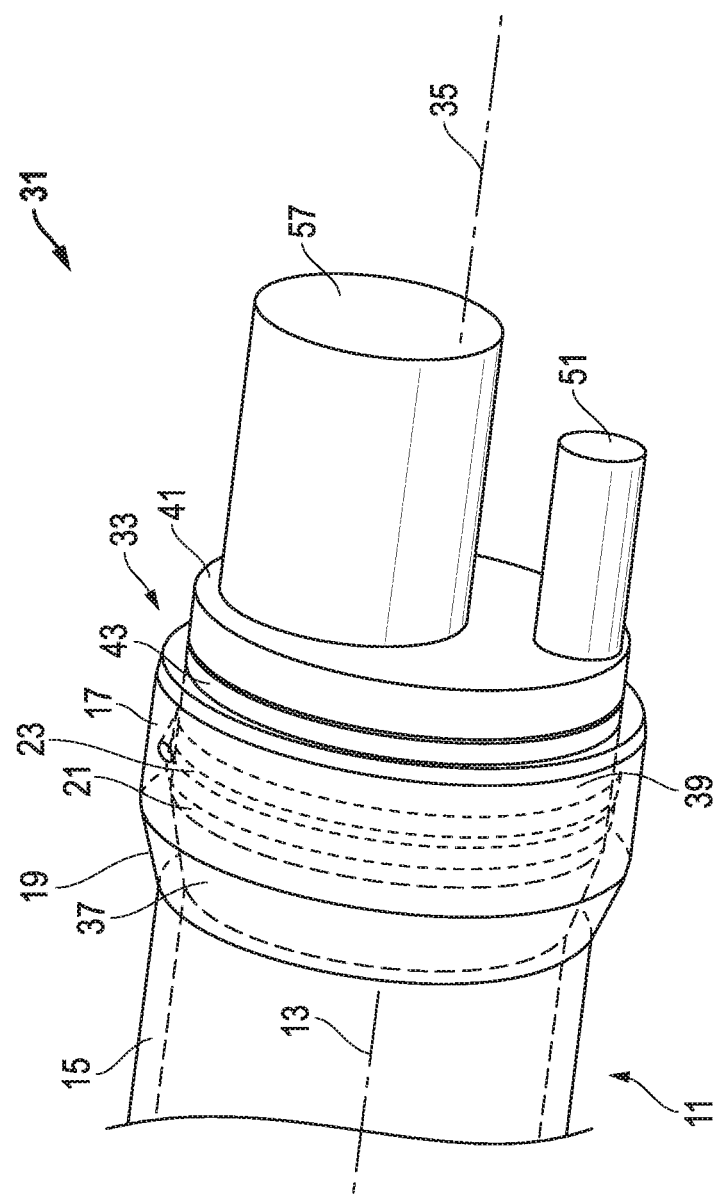
FIG. 3 is a partially-sectioned, isometric view of an embodiment of the machine of FIG. 2 in the pipe of FIG. 1.

As shown in the embodiment of FIGS. 2 and 3, a machine 31 for forming grooves 21, 23 may include a body 33 having an axis 35. In some versions, pipe axis 13 and axis 35 are coaxial during operation. The body 33 may comprise a head 37 configured to be complimentary in shape to the conical transition portion 19 of the pipe 11. Versions of the head 37 may be configured to abut and seat flushly against the conical transition portion 19 and be stationary relative to the body 33 and the pipe 11 during formation of the grooves 21, 23. The head 37 may be configured to not rotate about the axis 13 during formation of the grooves 21, 23.

Figure 4:
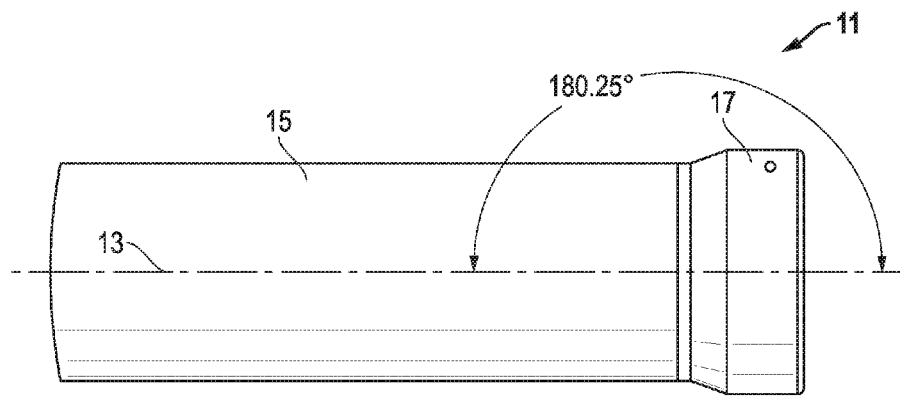
FIG. 4 is a side view of a pipe with an angular misalignment.

Embodiments of the head 37 may be configured to allow the machine 31 to overcome an angular misalignment between axes 13 of the cylindrical portion 15 of the pipe 11 and the cylindrical belled end 17 of the pipe 11. For example, FIG. 4 illustrates a situation wherein the angular misalignment between the axes 13 of the pipe cylindrical portion 15 and the pipe cylindrical belled end 17 is (for example) 0.25 degrees, rather than a perfect angular alignment of about 0 degrees and no angular misalignment.

Versions of the head 37 can overcome the angular misalignment starting at greater than 0 degrees. Examples of the angular misalignment can be at least about 0.05 degrees, such as at least about 0.1 degrees, at least about 0.2 degrees, at least about 0.3 degrees, at least about 0.4 degrees, at least about 0.5 degrees, or even at least about 1 degree. In other versions, the angular misalignment can be not greater than about 5 degrees, such as not greater than about 4 degrees, not greater than about 3 degrees, not greater than about 2 degrees, or even not greater than about 1 degree. Alternatively, the angular misalignment that the head 37 is capable of overcoming can be in a range between any of these values.

Figure 5:
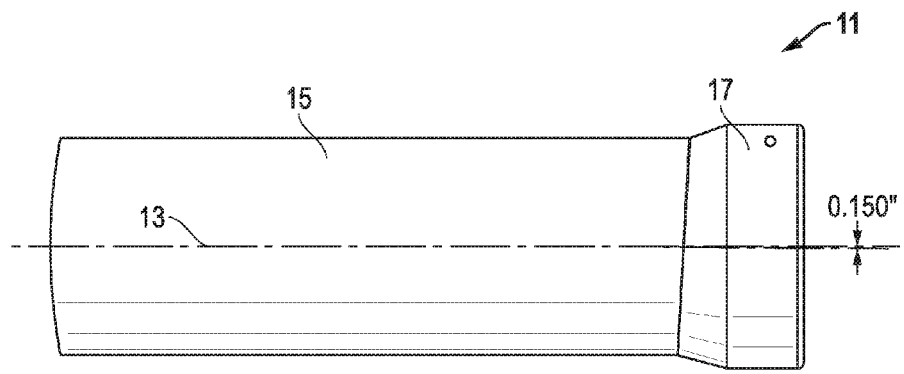
FIG. 5 is a side view of a pipe with a radial distance misalignment.

In other embodiments of the machine 31, the head 37 may be configured to allow the machine 31 to overcome a radial distance misalignment of axes 13 between the cylindrical portion 15 of the pipe 11 and the cylindrical belled end 17 of the pipe 11. For example, FIG. 5 illustrates a situation where the radial distance misalignment between the cylindrical portion 15 and the cylindrical belled end 17 is 0.150 inches (for example), rather than a perfect alignment at 0.0 inches and no radial distance misalignment.

Versions of the head 37 can overcome the radial distance misalignment starting at greater than 0 inches. The radial distance misalignment can be at least about 0.010 inches, at least about 0.025 inches, at least about 0.050 inches, at least about 0.075 inches, at least about 0.100 inches, or even at least about 0.125 inches. In other versions, the radial distance misalignment can be not greater than about 0.5 inches, such as not greater than about 0.4 inches, not greater than about 0.3 inches, or even not greater than about 0.2 inches. Alternatively, the radial distance misalignment that the head 37 is capable of overcoming can be in a range between any of these values.

Similarly, the radial distance misalignment of axes between the cylindrical portion 15 of the pipe 11 and the cylindrical belled end 17 of the pipe 11, may be expressed in terms of a percentage, and calculated based on the inner diameter of the pipe 11. For example, the radial distance misalignment can be greater than 0% of the pipe inner diameter, such as at least about 0.005% of the pipe inner diameter, at least about 0.010%, or even at least about 0.015% of the pipe inner diameter. In other versions, the radial distance misalignment can be not greater than about 0.050% of the pipe inner diameter, such as not greater than about 0.040% of the pipe inner diameter, not greater than about 0.035%, not greater than about 0.030%, or even not greater than about 0.025% of the pipe inner diameter. Alternatively, the radial distance misalignment that the head 37 is capable of overcoming can be in a range between any of these values.

Embodiments of the body 33 also may include a cutting portion 39 (FIGS. 2 and 3) configured to be complementary in shape to the cylindrical belled end 17 of the pipe 11. The cutting portion 39 may be configured to rotate relative to the body 33 and the pipe 11 during formation of the grooves 21, 23 to cut the one or more grooves 21, 23 inside the pipe 11.

Versions of the cutting portion 39 may be configured to have an outer diameter OD (FIG. 2) that is in a range of about smaller than an inner diameter ID (FIG. 1) of the cylindrical belled end 17 of the pipe 11. For example, the OD can be smaller than the pipe ID by at least about 0.05%, such as at least about 0.10%, at least about 0.15%, or even at least about 0.20%. In another example, the OD can be smaller than the pipe ID by not more than about 0.30%, such as not more than about 0.25%, or even not more than about 0.20%. Alternatively, the OD can be smaller than the pipe ID in a range between any of these values.

In another embodiment, the cutting portion 39 may be configured to substantially match a size of the cylindrical belled end 17 within a tolerance. For example, the tolerance can be at least about 0.010 inches (i.e., for the cylinders, at least about 0.005 inches per side). In another example, the tolerance can be at least about 0.015 inches, such as at least about 0.020 inches, or even at least about 0.025 inches. Other versions of the tolerance can be not greater than about 0.050 inches (i.e., not greater than about 0.025 inches per side). Other versions of the tolerance can be not greater than about 0.045 inches, such as not greater than about 0.040 inches, or even not greater than about 0.035 inches. Alternatively, the tolerance can be in a range between any of these values.

Other examples of the body 33 may further include a tail 41 (FIG. 2). In one version, the cutting portion 39 may be located axially between the head 37 and the tail 41. Embodiments of the tail 41 may be cylindrical and may comprise an outer surface that is substantially flush with the cutting portion 39. The tail 41 may be configured to be stationary relative to the body 33 and the pipe 11 during formation of the grooves 21, 23.

In addition, the body 33 of machine 31 may further include a drive gear 43. In an example, the drive gear 43 may be located axially between the cutting portion 39 and the tail 41. In addition, the drive gear 43 may be mounted to the cutting portion 39 for rotation therewith. The drive gear 43 also may be cylindrical and may include an outer surface that is substantially flush with the cutting portion 39 and the tail 41.

Figure 6:
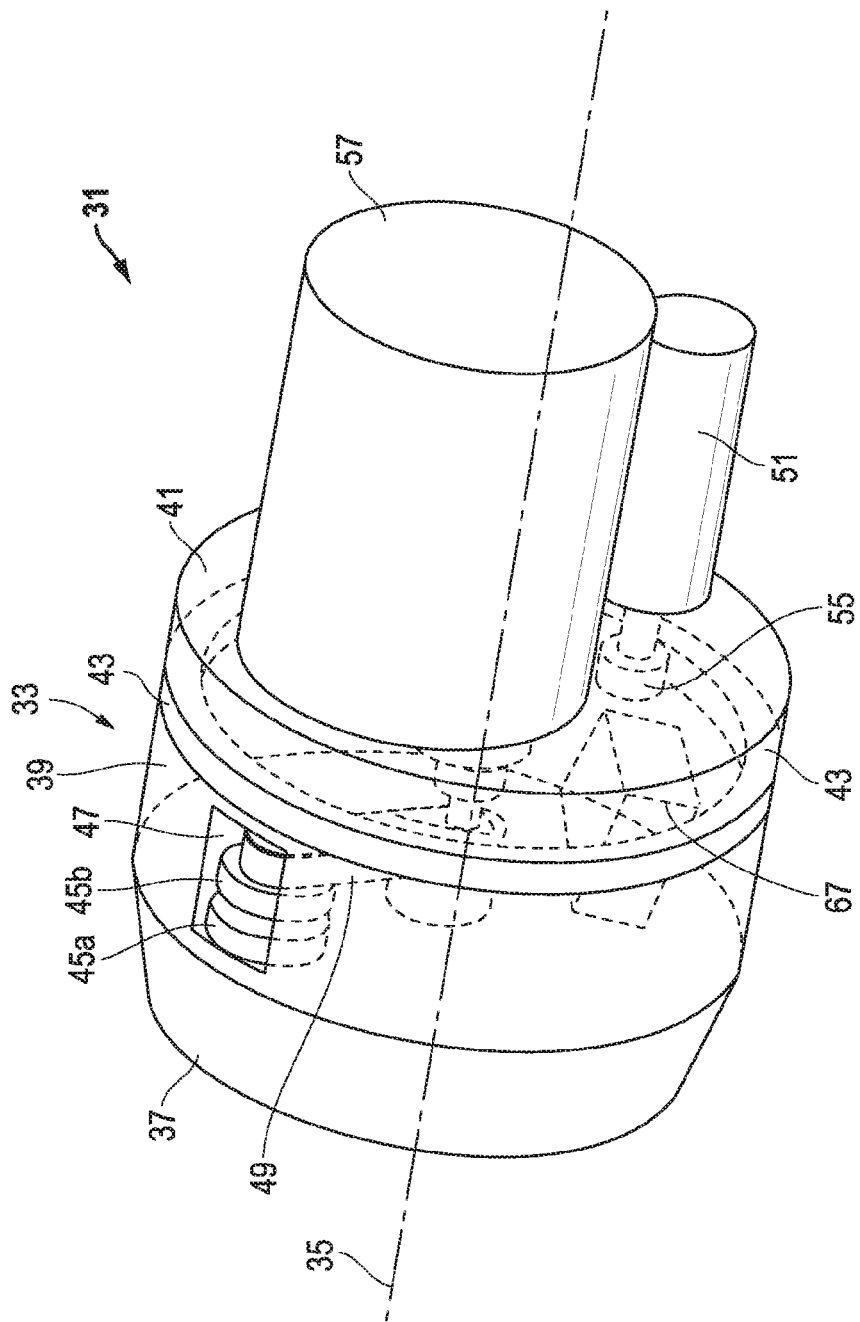
FIG. 6 is a partially-sectioned, isometric view of an embodiment of the machine of FIG. 2.

Embodiments of the cutting portion 39 may include at least one groove cutter 45 (e.g., two shown, 45a, 45b). In an example, the groove cutter 45 may comprise a cylindrical cutting wheel. Versions of the groove cutter 45 may be exposed through an aperture 47 (FIGS. 2 and 6) in the cutting portion 39. Embodiments of the groove cutter 45 may be rotatably mounted to one end of an arm 49. A second end of the arm 49 may be pivotally mounted to the body 33.

The arm 49 may be configured to pivot the groove cutter 45 into and out of engagement with an inner surface of the pipe 11. In some versions, the groove cutter 45 may be configured to rotate 360 degrees around the body 33.

Embodiments of the groove cutter 45 may include a first cutter 45a configured to cut the seal groove 21, and a second cutter 45b configured to cut the spline groove 23, which may be parallel to and axially spaced apart from the seal groove 21. The first cutter 45a can be the same size or a different size than the second cutter 45b. In an example, the first and second cutters 45a, 45b may be mounted to a common axle and configured to rotate together. In addition, the first and second cutters 45a, 45b may be configured to rotate relative to the cutting portion 39.

In another example, the body 33 of the machine 31 may include a cutting portion rotation motor 51 (FIG. 6) configured to rotate the cutting portion 39 relative to the body 33 and the pipe 11. The cutting portion rotation motor 51 may be configured to drive a pinion 55 that is mounted to an inner diameter of the drive gear 43. Versions of the body 33 also may include a groove cutter motor 57 that may be configured to rotate the groove cutter 45 relative to the cutting portion 39. In an example, the groove cutter 45 may be coupled to the groove cutter motor 57 via a drive belt on arm 49.

In some embodiments, the pipe 11 is configured to be stationary during formation of the grooves 21, 23. In addition, the cutting portion 39 may be configured to float and have at least some freedom of movement relative to the pipe 11. In one example, the freedom of movement can be in radial directions that are orthogonal to the axis 13 (FIG. 1). In another example, the cutting portion 39 may be configured to have at least some freedom of rotation relative to the pipe 11 about radial axes that are orthogonal to the axis 13.

Figure 7:
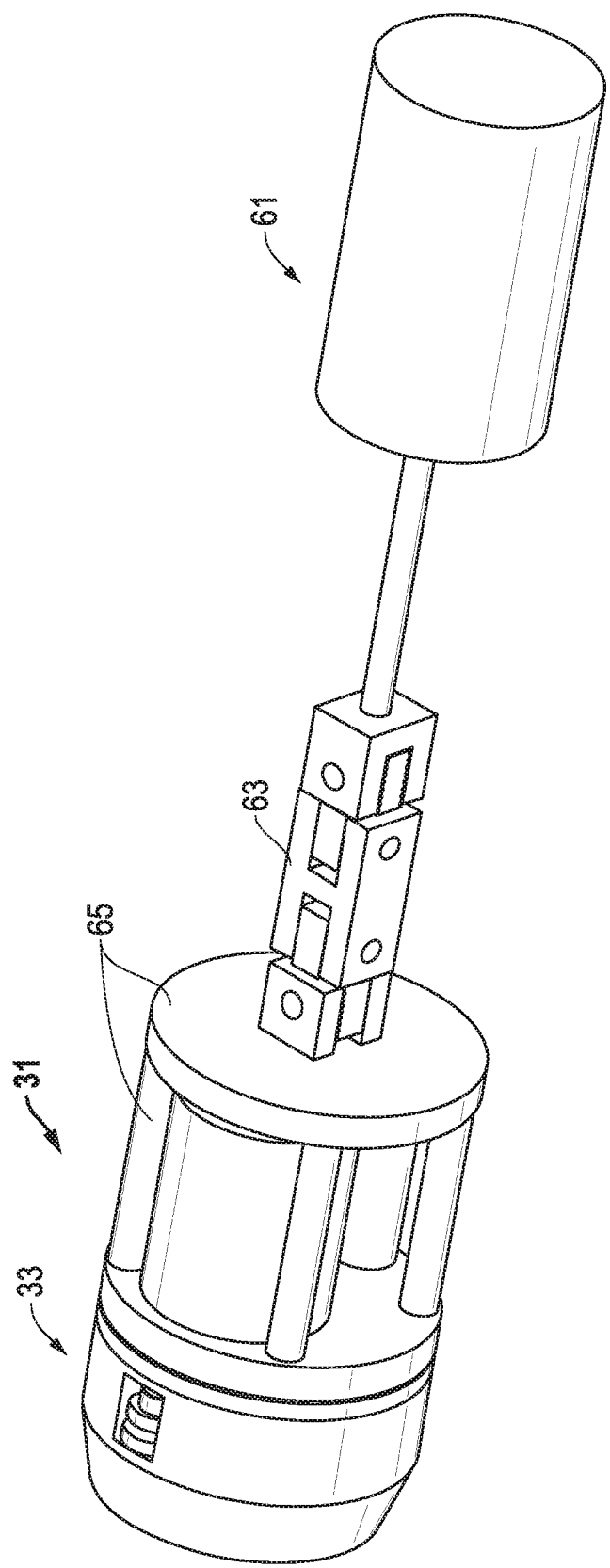
FIG. 7 is an isometric view of an embodiment of the machine of FIG. 2 coupled to a hydraulic system.

Embodiments of the machine 31 may further include means for axially moving the body 33 into and out of the pipe 11. For example, the means for axially moving the body 33 into and out of the pipe 11 may comprise a hydraulic system 61 (FIG. 7) coupled to the machine 31. In some versions, a frame 65 may be mounted to the machine 31 to facilitate coupling to the means for axially moving the body 33. The hydraulic system 61 may be coupled to the machine 31 with or without a coupling 63 and/or the frame 65. In one version, the coupling 63 may comprise a double U-joint configured to permit the machine 31 at least some freedom of rotation relative to the pipe 11, such as about radial axes that are orthogonal to the axis 13 of pipe 11.

Versions of the means for axially moving the body 33 may be configured to provide an axially compressive force against the machine 31 into the pipe 11 that is substantially constant during formation of the grooves 21, 23. For example, the axially compressive force can be at least about 2000 pounds, such as at least about 4000 pounds, at least about 6000 pounds, at least about 8000 pounds, or even at least about 10,000 pounds. In other examples, the axially compressive force can be not greater than about 50,000 pounds, such as not greater than about 45,000 pounds, not greater than about 40,000 pounds, not greater than about 35,000 pounds, or even not greater than about 30,000 pounds. Alternatively, the axially compressive force can be in a range between any of these values.

In still another embodiment, the machine 31 may further include a vacuum system 67 (FIG. 6) that may be configured to remove cutting swarf produced during formation of the grooves 21, 23, out of machine 31.

Embodiments of a method of forming a groove inside a pipe also are disclosed. For example, the method may include restraining the pipe from movement; axially moving a machine into the pipe, such that a head of the machine seats against the conical transition portion of the pipe and applies a compressive force therebetween; rotating a cutter in a cutting portion of the machine adjacent the cylindrical belled end, and moving the cutter into contact with an interior surface of the cylindrical belled end; rotating the cutting portion about the axis such that the cutter circumferentially forms a groove inside the cylindrical belled end; removing the cutter from contact with the cylindrical belled end; and then axially removing the machine from the pipe.

In other embodiments, the method may include restraining only the cylindrical portion of pipe from movement, and not restraining the cylindrical belled end or the conical transition portion from movement. If the groove comprises a spline groove, the method may further comprise forming a spline hole from an exterior of the pipe to the groove. In still another embodiment, the method may further comprise removing the head and cutting portion from the machine, and installing a second head and a second cutting portion on the machine for a second pipe having a different diameter than the pipe.

In one version, the method may include abutting and flushly seating the head against the conical transition portion, such that the head is stationary relative to the pipe during formation of the groove. In addition, the method may comprise overcoming an angular misalignment between axes of the cylindrical portion of the pipe and the cylindrical belled end of the pipe. The angular misalignment can be in a range of greater than 0 degrees to about 5 degrees, in one version. Moreover, the method may include overcoming a radial distance misalignment of axes between the cylindrical portion of the pipe and the cylindrical belled end of the pipe. The radial distance misalignment can be in a range of greater than 0 inches to about 0.5 inches, in one version. Alternatively, the radial distance misalignment can be in a range of greater than 0% to about 0.04%, in another version.

The method may include pivoting the cutter into and out of contact with the pipe. The method also may comprise simultaneously forming two grooves inside the pipe. In addition, the method may comprise floating the cutting portion to have at least some freedom of movement relative to the pipe, such as in radial directions that are orthogonal to the axis. Furthermore, the method may include providing the cutting portion at least some freedom of rotation relative to the pipe about radial axes that are orthogonal to the axis.

Embodiments of the initial and final steps of the method may include hydraulically moving the machine into and out of the pipe, respectively. Embodiments of the method may comprise applying the compressive force at a substantially constant level during formation of the groove, and the compressive force can be about 2000 pounds to about 50,000 pounds. Additionally, the method may further comprise producing cutting swarf produced during formation of the groove, and evacuating the cutting swarf during formation of the groove.

Other versions may include one or more of the following embodiments:

Embodiment 1. A machine for forming a groove inside a pipe, the pipe having an axis, a cylindrical portion, a cylindrical belled end and a conical transition portion between the cylindrical portion and the cylindrical belled end, the machine comprising:

a body having an axis and comprising a head configured to be complimentary in shape to the conical transition portion, a cutting portion configured to be complementary in shape to the cylindrical belled end, and the cutting portion is configured to rotate relative to the body and the pipe during formation of the groove to cut the groove inside the pipe.

Embodiment 2. The machine of any of these embodiments, wherein the head is configured to abut and seat flushly against the conical transition portion and be stationary relative to the body and the pipe during formation of the groove.

Embodiment 3. The machine of any of these embodiments, wherein the cutting portion is configured to have an outer diameter that is in a range of about 0.05% to about 0.3% smaller than an inner diameter of the cylindrical belled end of the pipe.

Embodiment 4. The machine of any of these embodiments, wherein the cutting portion is configured to substantially match a size of the cylindrical belled end within a tolerance of about 0.010 inches to about 0.050 inches.

Embodiment 5. The machine of any of these embodiments, wherein the head is configured to allow the machine to overcome an angular misalignment between axes of the cylindrical portion of the pipe and the cylindrical belled end of the pipe, and the angular misalignment is in a range of greater than 0 degrees to about 5 degrees.

Embodiment 6. The machine of any of these embodiments, wherein the head is configured to allow the machine to overcome a radial distance misalignment of axes between the cylindrical portion of the pipe and the cylindrical belled end of the pipe, and the radial distance misalignment is in a range of greater than 0 inches to about 0.5 inches.

Embodiment 7. The machine of any of these embodiments, wherein the head is configured to allow the machine to overcome a radial distance misalignment of axes between the cylindrical portion of the pipe and the cylindrical belled end of the pipe, and the radial distance misalignment is in a range of greater than 0% to about 0.04%.

Embodiment 8. The machine of any of these embodiments, wherein the body further comprises a tail, and the cutting portion is located axially between the head and the tail.

Embodiment 9. The machine of any of these embodiments, wherein the tail is cylindrical and comprises an outer surface that is substantially flush with the cutting portion.

Embodiment 10. The machine of any of these embodiments, wherein the tail is configured to be stationary relative to the body and the pipe during formation of the groove.

Embodiment 11. The machine of any of these embodiments, wherein the body further comprises a drive gear, the drive gear is located axially between the cutting portion and the tail, and the drive gear is mounted to the cutting portion for rotation therewith.

Embodiment 12. The machine of any of these embodiments, wherein the drive gear is cylindrical and comprises an outer surface that is substantially flush with the cutting portion and the tail.

Embodiment 13. The machine of any of these embodiments, wherein the cutting portion comprises a groove cutter.

Embodiment 14. The machine of any of these embodiments, wherein the groove cutter comprises a cylindrical cutting wheel.

Embodiment 15. The machine of any of these embodiments, where the groove cutter is exposed through an aperture in the cutting portion.

Embodiment 16. The machine of any of these embodiments, wherein the groove cutter is rotatably mounted to one end of an arm, and a second end of the arm is pivotally mounted to the body such that the arm is configured to pivot the groove cutter into and out of engagement with an inner surface of the pipe.

Embodiment 17. The machine of any of these embodiments, wherein the groove cutter is configured to rotate 360 degrees around the body.

Embodiment 18. The machine of any of these embodiments, wherein the groove cutter comprises a first cutter configured to cut a spline groove, and a second cutter configured to cut a seal groove that is parallel to and axially spaced apart from the spline groove.

Embodiment 19. The machine of any of these embodiments, wherein the first cutter is larger than the second cutter.

Embodiment 20. The machine of any of these embodiments, wherein the first and second cutters are mounted to a common axle and configured to rotate together.

Embodiment 21. The machine of any of these embodiments, wherein the first and second cutters are configured to rotate relative to the cutting portion.

Embodiment 22. The machine of any of these embodiments, wherein the body comprises a cutting portion rotation motor configured to rotate the cutting portion relative to the body and the pipe.

Embodiment 23. The machine of any of these embodiments, wherein the body further comprises a drive gear, and the cutting portion rotation motor is configured to drive a pinion that is mounted to an inner diameter of the drive gear.

Embodiment 24. The machine of any of these embodiments, wherein the cutting portion has a cutter, and the body comprises a groove cutter motor configured to rotate the cutter relative to the cutting portion.

Embodiment 25. The machine of any of these embodiments, wherein the cutter is coupled to the groove cutter motor via a drive belt.

Embodiment 26. The machine of any of these embodiments, wherein the pipe is configured to be stationary during formation of the groove.

Embodiment 27. The machine of any of these embodiments, wherein the cutting portion is configured to float and have at least some freedom of movement relative to the pipe.

Embodiment 28. The machine of any of these embodiments, wherein the cutting portion is configured to have at least some freedom of rotation relative to the pipe about radial axes that are orthogonal to the axis.

Embodiment 29. The machine of any of these embodiments, wherein the head is configured to not rotate about the axis during formation of the groove.

Embodiment 30. The machine of any of these embodiments, further comprising means for axially moving the body into and out of the pipe.

Embodiment 31. The machine of any of these embodiments, wherein the means for axially moving the body into and out of the pipe comprises a hydraulic system coupled to the machine.

Embodiment 32. The machine of any of these embodiments, wherein the hydraulic system is coupled to the machine with a coupling.

Embodiment 33. The machine of any of these embodiments, wherein the coupling comprises a double U-joint configured to permit the machine at least some freedom of rotation relative to the pipe about radial axes that are orthogonal to the axis.

Embodiment 34. The machine of any of these embodiments, wherein the means for axially moving the body is configured to provide an axially compressive force against the machine into the pipe that is substantially constant during formation of the groove, and the axially compressive force is about 2000 pounds to about 50,000 pounds.

Embodiment 35. The machine of any of these embodiments, further comprising a vacuum system configured to remove cutting swarf produced during formation of the groove.

Embodiment 36. A method of forming a groove inside a pipe, the pipe having an axis, a cylindrical portion, a cylindrical belled end and a conical transition portion between the cylindrical portion and the cylindrical belled end, the method comprising:

(a) restraining the pipe from movement;

(b) axially moving a machine into the pipe, such that a head of the machine seats against the conical transition portion of the pipe and applies a compressive force therebetween;

(c) rotating a cutter in a cutting portion of the machine adjacent the cylindrical belled end, and moving the cutter into contact with an interior surface of the cylindrical belled end;

(d) rotating the cutting portion about the axis such that the cutter circumferentially forms a groove inside the cylindrical belled end;

(e) removing the cutter from contact with the cylindrical belled end; and then (f) axially removing the machine from the pipe.

Embodiment 37. The method of any of these embodiments, wherein step (a) comprises only restraining the cylindrical portion of pipe from movement, and not restraining the cylindrical belled end or the conical transition portion.

Embodiment 38. The method of any of these embodiments, wherein the groove comprises a spline groove, and further comprising forming a spline hole from an exterior of the pipe to the groove.

Embodiment 39. The method of any of these embodiments, further comprising removing the head and cutting portion from the machine, and installing a second head and a second cutting portion on the machine for a second pipe having a different diameter than the pipe.

Embodiment 40. The method of any of these embodiments, wherein step (b) comprises abutting and flushly seating the head against the conical transition portion, such that the head is stationary relative to the pipe during formation of the groove.

Embodiment 41. The method of any of these embodiments, wherein step (b) comprises overcoming an angular misalignment between axes of the cylindrical portion of the pipe and the cylindrical belled end of the pipe, and the angular misalignment is in a range of greater than 0 degrees to about 5 degrees.

Embodiment 42. The method of any of these embodiments, wherein step (b) comprises overcoming a radial distance misalignment of axes between the cylindrical portion of the pipe and the cylindrical belled end of the pipe, and the radial distance misalignment is in a range of greater than 0 inches to about 0.5 inches.

Embodiment 43. The method of any of these embodiments, wherein step (b) comprises overcoming a radial distance misalignment of axes between the cylindrical portion of the pipe and the cylindrical belled end of the pipe, and the radial distance misalignment is in a range of greater than 0% to about 0.04%.

Embodiment 44. The method of any of these embodiments, wherein the machine further comprises a tail, the cutting portion is located axially between the head and the tail, and the tail is stationary relative to the pipe during formation of the groove.

Embodiment 45. The method of any of these embodiments, wherein the machine further comprises a drive gear, and the drive gear rotates with the cutting portion.

Embodiment 46. The method of any of these embodiments, wherein steps (c) and (e) comprise pivoting the cutter into and out of contact with the pipe, respectively.

Embodiment 47. The method of any of these embodiments, wherein step (d) comprises simultaneously forming two grooves inside the pipe.

Embodiment 48. The method of any of these embodiments, wherein step (d) comprises rotating the cutter relative to the cutting portion.

Embodiment 49. The method of any of these embodiments, wherein step (d) comprises floating the cutting portion to have at least some freedom of movement relative to the pipe.

Embodiment 50. The method of any of these embodiments, wherein step (d) comprises providing the cutting portion at least some freedom of rotation relative to the pipe about radial axes that are orthogonal to the axis.

Embodiment 51. The method of any of these embodiments, wherein steps (b) and (f) comprise hydraulically moving the machine into and out of the pipe, respectively.

Embodiment 52. The method of any of these embodiments, wherein step (b) comprises applying the compressive force at a substantially constant level during formation of the groove.

Embodiment 53. The method of any of these embodiments, wherein the compressive force is about 2000 pounds to about 50,000 pounds.

Embodiment 54. The method of any of these embodiments, wherein step (d) further comprises producing cutting swarf produced during formation of the groove, and evacuating the cutting swarf during formation of the groove.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A machine for forming a groove inside a pipe, the pipe having an axis, a cylindrical portion, a cylindrical belled end having a belled end diameter that is greater than a diameter of the cylindrical portion, and a conical transition portion extending continuously between the cylindrical portion and the cylindrical belled end, the machine comprising:
a body having an axis and comprising a head that is conical and configured to be complimentary in shape to the conical transition portion, a cutting portion configured to be complementary in shape to the cylindrical belled end, the cutting portion has a cutting portion diameter that is larger than the diameter of the cylindrical portion of the pipe, and the cutting portion is configured to rotate relative to the body and the pipe during formation of the groove to cut the groove inside the pipe.

2. The machine of claim 1, wherein the head is configured to abut and seat flushly against the conical transition portion and be stationary relative to the body and the pipe during formation of the groove.

3. The machine of claim 1, wherein the head is configured to allow the machine to overcome an angular misalignment between axes of the cylindrical portion of the pipe and the cylindrical belled end of the pipe, and the angular misalignment is in a range of greater than 0 degrees to about 5 degrees.

4. The machine of claim 1, wherein the head is configured to allow the machine to overcome a radial distance misalignment of axes between the cylindrical portion of the pipe and the cylindrical belled end of the pipe, and the radial distance misalignment is in a range of greater than 0 inches to about 0.5 inches.

5. The machine of claim 1, wherein the body further comprises a tail, and the cutting portion is located axially between the head and the tail.

6. The machine of claim 1, wherein the cutting portion comprises a groove cutter.

7. The machine of claim 1, wherein the body comprises a cutting portion rotation motor configured to rotate the cutting portion relative to the body and the pipe.

8. The machine of claim 1, wherein the cutting portion has a cutter, and the body comprises a groove cutter motor configured to rotate the cutter relative to the cutting portion.

9. The machine of claim 1, wherein the cutting portion is configured to float and have at least some freedom of movement relative to the pipe.

10. The machine of claim 1, further comprising means for axially moving the body into and out of the pipe.

11. A method of forming a groove inside a pipe, the pipe having an axis, a cylindrical portion, a cylindrical belled end and a conical transition portion between the cylindrical portion and the cylindrical belled end, the method comprising:
   (a) restraining the pipe from movement;
   (b) axially moving a machine into the pipe, such that a head of the machine seats against the conical transition portion of the pipe and applies a compressive force therebetween;
   (c) rotating a cutter in a cutting portion of the machine adjacent the cylindrical belled end, and moving the cutter into contact with an interior surface of the cylindrical belled end;
   (d) rotating the cutting portion about the axis such that the cutter circumferentially forms a groove inside the cylindrical belled end;
   (e) removing the cutter from contact with the cylindrical belled end; and then
   (f) axially removing the machine from the pipe.

12. The method of claim 11, further comprising removing the head and cutting portion from the machine, and installing a second head and a second cutting portion on the machine for a second pipe having a different diameter than the pipe.

13. The method of claim 11, wherein step (b) comprises abutting and flushly seating the head against the conical transition portion, such that the head is stationary relative to the pipe during formation of the groove.

14. The method of claim 11, wherein step (b) comprises overcoming an angular misalignment between axes of the cylindrical portion of the pipe and the cylindrical belled end of the pipe, and the angular misalignment is in a range of greater than 0 degrees to about 5 degrees.

15. The method of claim 11, wherein step (b) comprises overcoming a radial distance misalignment of axes between the cylindrical portion of the pipe and the cylindrical belled end of the pipe, and the radial distance misalignment is in a range of greater than 0 inches to about 0.5 inches.

16. The method of claim 11, wherein steps (c) and (e) comprise pivoting the cutter into and out of contact with the pipe, respectively.

17. The method of claim 11, wherein step (d) comprises rotating the cutter relative to the cutting portion.

18. The method of claim 11, wherein step (d) comprises floating the cutting portion to have at least some freedom of movement relative to the pipe.

19. The method of claim 11, wherein steps (b) and (f) comprise hydraulically moving the machine into and out of the pipe, respectively.

20. The method of claim 11, wherein step (b) comprises applying the compressive force at a substantially constant level during formation of the groove.

* * * * *